(12) United States Patent
Brannon

(10) Patent No.: US 10,081,717 B2
(45) Date of Patent: *Sep. 25, 2018

(54) POLYMERIC MATERIALS

(71) Applicant: COLORMATRIX HOLDINGS, INC., Wilmington, DE (US)

(72) Inventor: Philip Brannon, Merseyside (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 316 days.

This patent is subject to a terminal disclaimer.

(21) Appl. No.: 14/761,747

(22) PCT Filed: Jan. 13, 2014

(86) PCT No.: PCT/GB2014/050087
§ 371 (c)(1),
(2) Date: Jul. 17, 2015

(87) PCT Pub. No.: WO2014/114912
PCT Pub. Date: Jul. 31, 2014

(65) Prior Publication Data
US 2015/0361243 A1  Dec. 17, 2015

Related U.S. Application Data

(60) Provisional application No. 61/755,673, filed on Jan. 23, 2013.

(51) Int. Cl.
C08K 3/22 (2006.01)
C08L 77/02 (2006.01)
C08L 77/06 (2006.01)

(52) U.S. Cl.
CPC ........ C08K 3/22 (2013.01); *C08K 2003/2258* (2013.01); *C08L 77/02* (2013.01); *C08L 77/06* (2013.01)

(58) Field of Classification Search
CPC .................................................. C09K 3/22
USPC ....................................................... 524/406
See application file for complete search history.

(56) References Cited

U.S. PATENT DOCUMENTS

| | | | |
|---|---|---|---|
| 3,733,309 A | 5/1973 | Wyeth et al. | |
| 4,359,570 A | 11/1982 | Davis et al. | |
| 5,340,884 A * | 8/1994 | Mills | C08L 67/02 264/523 |
| 5,521,257 A * | 5/1996 | Ross | C08G 73/1092 525/420 |
| 6,762,275 B1 | 7/2004 | Rule et al. | |
| 2006/0110557 A1* | 5/2006 | Xia | C08K 3/08 428/35.7 |
| 2006/0293493 A1 | 12/2006 | Kulkarni et al. | |
| 2008/0058495 A1* | 3/2008 | Quillen | C08K 5/0041 528/272 |
| 2009/0035502 A1* | 2/2009 | Tammaji | B29C 49/0005 428/36.4 |
| 2010/0184901 A1* | 7/2010 | Adochio | B82Y 30/00 524/406 |
| 2010/0220388 A1* | 9/2010 | Suzuki | B32B 17/10 359/359 |
| 2010/0310787 A1 | 12/2010 | Lehmann et al. | |
| 2011/0148154 A1* | 6/2011 | Hori | B60J 7/22 296/217 |
| 2011/0292502 A1* | 12/2011 | Meyer | C08K 3/04 359/359 |

FOREIGN PATENT DOCUMENTS

| | | |
|---|---|---|
| JP | 2007-138156 | 6/2007 |
| WO | 2005095516 A1 | 10/2005 |
| WO | 2007064312 A2 | 6/2007 |
| WO | 2013011330 A2 | 1/2013 |

* cited by examiner

*Primary Examiner* — Doris L Lee
(74) *Attorney, Agent, or Firm* — Fay Sharpe LLP

(57) ABSTRACT

(A) a polymer composition (especially a polyester composition) which includes a compound of tungsten and oxygen (especially tungsten oxide particles) and an additional additive, wherein said additional additive is selected from an acetaldehyde scavenger and a colourant, wherein when said polymer composition includes an acetaldehyde scavenger, said polymer composition includes at least 10 ppm (suitably at least 25 ppm, preferably at least 50 ppm) of said acetaldehyde scavenger and when said polymer composition includes a colourant, said polymer composition includes at least 50pprh (suitably at least 75 ppm, preferably at least 100 ppm) of said colourant, wherein: preferably said article is a preform for a container; or (B) a sheet comprising a polymer composition (especially a polyester, polycarbonate or polyolefin composition) which includes a compound of tungsten and oxygen (especially tungsten oxide particles), wherein said sheet has a width of at least G.3 m.

19 Claims, 8 Drawing Sheets

POLYMERIC MATERIALS

This invention relates to polymeric materials and particularly, although not exclusively, relates to polyesters for use in manufacturing of sheet or packaging.

Many plastic packages, such as those made from poly (ethylene terephthalate) (PET) and used in beverage containers, are formed by reheat blow-molding, or other operations that require heat softening of the polymer.

In reheat blow-molding, bottle preforms, which are test-tube shaped injection moldings, are heated above the glass transition temperature of the polymer, and the positioned in a bottle mold to receive pressurized air through their open end. This technology is well known in the art, as shown, for example in U.S. Pat. No, 3,733,309, incorporated herein by reference. In a typical blow-molding operation, radiation energy from quartz infrared heaters is generally used to reheat the preforms.

In the preparation of packaging containers using operations that require heat softening of the polymer, the reheat time, or the time required for the preform to reach the proper temperature for stretch blow molding (also called the heat-up time), affects both the productivity and the energy required. As processing equipment has improved, it has become possible to produce more units per unit time. Thus it is desirable to provide polyester compositions which provide improved reheat properties, by reheating faster (increased reheat rate), or with less reheat energy (increased reheat efficiency), or both, compared to conventional polyester compositions.

The aforementioned reheat properties vary with the absorption characteristics of the polymer itself. Heat lamps used for reheating polymer preforms, such as quartz infrared lamps, have a broad light emission spectrum, with wavelengths ranging from about 500 nm to greater than 1,500 nm. However, polyesters, especially PET, absorb electromagnetic radiation poorly in the region from 500 nm to 1,500 nm. Thus, in order to maximize energy absorption from the lamps and increase preforms' reheat rate, materials that will increase infrared energy absorption are sometimes added to PET. Unfortunately, these materials tend to have a negative effect on the visual appearance of PET containers, for example increasing the haze level and/or causing the article to have a dark appearance. Further, since compounds with absorbance in the visible light wavelength range (400 nm to 780 nm) appear colored to the human eye, materials that absorb and/or scatter visible light will impart color to the polymer.

A variety of black and grey body absorbing compounds have been used as reheat agents to improve the reheat characteristics of polyester preforms under reheat lamps. These conventional reheat additives include carbon black, graphite, antimony metal, black iron oxide, red iron oxide, inert iron compounds, spinal pigments, and infrared-absorbing dyes. The amount of absorbing compound that can be added to a polymer is limited by its impact on the visual properties of the polymer, such as brightness, which may be expressed as an L* value, and color, which is measured and expressed by a* and b* values.

To retain an acceptable level of brightness and color in the preform and resulting blown articles, the quantity of reheat additive may be decreased, which in turn decreases reheat rates. Thus, the type and amount of reheat additive added to a polyester resin may be adjusted to strike the desired balance between increasing the reheat rate and retaining acceptable brightness and color levels.

US2010/0184901 (Adochio) includes a generic disclosure relating to transparent, colourless infra-red, absorbing compositions comprising nanoparticles. It discloses tungsten oxide particles which may incorporate elements selected from H, He, alkali metals, alkaline-earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I. Furthermore, it discloses ranges for particle sizes for the materials described and ranges for loading levels. The document suggests the particles described may be dispersed in a binder which may be selected from thermoplastic compositions, thermosetting compositions, radiation curing compositions, as well as compositions comprising a metal alkoxide. Suitable thermoplastic resins are said to include, but are not limited to, polyesters, polycarbonates, polyamides, polyolefins, polystyrenes, vinyl polymers, acrylic polymers and copolymers and blends thereof. Suitable thermosetting resins may be selected from for example, acrylic, saturated or unsaturated polyester, polyurethane or polyether, polyvinyl, cellulosic, acrylate, silicon-based polymers, copolymers thereof, and mixtures thereof, and can contain reactive groups such as epoxy, carboxylic acid, hydroxyl, isocyanate, amide, carbamate and carboxylate groups, among others, including mixtures thereof. Suitable radiation-curable compositions are said to include, radiation curable oligomers and polymers including (meth)acrylated urethanes (i.e., urethane (meth)acrylates), (meth)acrylated epoxies (i.e., epoxy(meth)acrylates), (meth)acrylated polyesters (i.e., polyester(meth)acrylates), (meth)acrylated melamine (i.e., melamine(meth)acrylates), (meth)acrylated (meth)acrylics, (meth)acrylated silicones, (meth)acrylated polyethers (i.e., polyether (meth)acrylates), vinyl (meth)acrylates, and (meth)acrylated oils.

US2010/184901 also asserts the use of the materials described in producing coating compositions and in producing articles, such as sheet, film, bottles, trays, other packaging, rods, tubes, lids, fibres and injection molded articles.

US2010/184901 does not include any specific examples. However, it is essential (see claim 1 and [0005]]) according to the document for the generically-described tungsten oxide particles described to have "average primary particle size of no more than 300 nm" and it is preferred for the particles to be even smaller. However, it is expensive to produce such particle and such particles may disadvantageously lead to too much (blue) toning of polymers into which they are introduced.

Although it is clear there are many materials which could be incorporated into polyester preforms to produce sufficient reheat, it is an ongoing challenge to achieve sufficient reheat, whilst maintaining suitable optical properties of the preforms (and bottles blown therefrom). In particular, it is challenging to provide sufficient reheat without excessive (and unacceptable) darkening or colouring of the polyester. This is particularly relevant where preforms are to be used to manufacture liquid containers such as beverage bottles, especially for use in containing mineral water, where high transparency and an absence of colour (or presence of a slight blueish colour) are considered desirable and/or essential.

Transparency is usually presented as L* in the CIELAB system, with 100 being the lightest and 0 being the darkest. Therefore, high L* is desirable. In addition it is desirable for b* to be close to zero or slightly negative and for a* to be close to zero.

A commercially available activated carbon reheat additive is sold by Polytrade under the reference U1. Whist the level of reheat achieved is acceptable, it is difficult to increase the level of reheat without undesirable darkening and/or colouring of the polymer.

Commercially available titanium nitride reheat additives are described in WO2005/095516 (ColorMatrix) and WO2007/064312 (Eastman). At the levels proposed reheat is adequate; however if more titanium nitride is used in an attempt to boost reheat, L* is reduced, b* becomes too negative (i.e. blueing of polymer is two great) and consequently toners need to be added to counteract the effect. However, addition of toners further disadvantageously lowers L*.

In addition, reheat agents are used in sheets for improving reheat of the sheets during thermoforming. However, it is challenging, especially for thick sheets, to incorporate sufficient material to produce a desired level of reheat, whilst maintaining a neutral sheet colour.

It is an object of preferred embodiments of the present invention to provide advantageous reheat additives for preforms, containers and/or sheets.

It is an object of preferred embodiments of the invention to provide an additive for polyester preforms which has an improved reheat with a reduced impact on transparency and/or L*.

It is an object of preferred embodiments of the invention to provide an additive for polyester preforms which has an improved reheat with a reduced impact on transparency and/or L* together with a b* which is close to zero and/or which is not too positive as to impart an undesirable yellow colour and/or which is not too negative as to impart too great a blueing effect.

According to a first aspect of the invention, there is provided an article comprising:

(A) a polymer composition (especially a polyester composition) which includes a compound of tungsten and oxygen (especially tungsten oxide particles) and an additional additive, wherein said additional additive is selected from an acetaldehyde scavenger and a colourant, wherein when said polymer composition includes an acetaldehyde scavenger, said polymer composition includes at least 10 ppm) (suitably at least 25 ppm, preferably at least 50 ppm) of said acetaldehyde scavenger and when said polymer composition includes a colourant, said polymer composition includes at least 50 ppm (suitably at least 75 ppm, preferably at least 100 ppm) of said colourant, wherein preferably said article is a preform for a container; or (B) a sheet comprising a polymer composition (especially a polyester, polycarbonate or polyolefin composition) which includes a compound of tungsten and oxygen (especially tungsten oxide particles), wherein said sheet has a width of at least 0.3 m.

Suitably, in both paragraphs (A) and (B) said compound of tungsten and oxygen includes 10.30 to 20.65 wt % oxygen, preferably 15.00 to 20.64 wt % oxygen, more preferably 18.86 to 20.64 wt % oxygen, especially 19.4 to 19.9 wt % oxygen. The balance may consist of tungsten and up to 1.0 wt %, especially up to 0.5 wt % of impurities. Thus, the sum of the wt % of tungsten and oxygen in said compound of tungsten and oxygen is preferably at least 99 wt %, especially at least 99.95 wt %.

Said compound of tungsten and oxygen has been found to be surprisingly advantageous over commercially available titanium nitride and carbon-based reheat agents in terms of reheat performance, L* and/or b*, at least.

Said compound of tungsten and oxygen (for example said tungsten oxide particles) preferably comprise at least 70 wt %, at least 80 wt %, at least 90 wt %, at least 95 wt %, at least 99 wt % or, especially, at least 99.5 wt % of tungsten and oxygen moieties. Thus, it is preferably a tungsten oxide.

A reference to "ppm" herein refers "parts per million by weight".

Said polymer composition (especially said polyester composition) may include 5 to 150 ppm, suitably 12 to 150 ppm, preferably 12 to 100 ppm, more preferably 12 to 50 ppm, especially 20 to 50 ppm of said compound of tungsten and oxygen, preferably tungsten oxide particles, especially a tungsten oxide which includes 18.86 to 20.64 wt % oxygen.

Said compound of tungsten and oxygen is preferably substantially homogenously dispersed throughout the polymer composition (especially said polyester composition).

At least 80 wt %, at least 90 wt %, at least 95 wt % or at least 99 wt % of said article (especially said preform) is suitably made up of said polymer composition (especially said polyester composition). Said article (especially said preform) preferably consists essentially of said polyester composition.

Said article (especially said preform) may include 5 to 150 ppm, suitably 12 to 150 ppm, preferably 12 to 100 ppm, more preferably 12 to 50 ppm, especially 20 to 50 ppm of said compound of tungsten and oxygen, especially a tungsten oxide which includes 18.86 to 20.64 wt % oxygen.

Said preform suitably has a weight in the range 12 g to 1200 g, preferably in the range 15 to 40 g, more preferably in the range 18 to 40 g. Said preform may include 0.00009 g to 0.006 g of said compound of tungsten and oxygen, especially a tungsten oxide which includes 18.86 to 20.64 wt % oxygen.

Said sheet may have a weight of at least 1 g, for example at least 100 g. The weight may be less than 5 kg.

Said polymer composition is preferably a said polyester composition. Said polyester composition preferably includes at least 70 wt %, at least 80 wt %, at least 90 wt %, at least 95 wt %, at least 98 wt % or at least 99 wt % of a polyester polymer. Said polyester composition may include less than 99.99 wt % or less than 99.95 wt % of polyester polymer.

Examples of suitable polyester polymers include one or more of PET, polyethylene naphthalate (PEN), poly(1,4-cyclo-hexylenedimethylene)terephthalate (PCT), poly(ethylene-co-1,4-cyclonexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate) (PETA) and their blends or their copolymers. Examples of suitable polyesters include those described in U.S. Pat. No. 4,359 570, incorporated herein by reference in its entirety.

The term polyester is also intended to include polyester derivatives, including, but not limited to, polyether esters, polyester amides, and polyether ester amides. Therefore, for simplicity, throughout the specification and claims, the terms polyester, polyether ester, polyester amide, and polyether ester amide may be used interchangeably and are typically referred to as polyester.

Preferably, said polyester polymer comprises, preferably consists essentially of, PET, PEN and copolymers or mixtures thereof. Said polyester polymer preferably comprises, more preferably consists essentially of, polyethylene terephthalate (PET).

Suitably, polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole % or at least 92 mole %, or at least 96 mole %, as measured by the mole % of ingredients in the finished polymer. Thus, a polyethylene terephthalate polymer may comprise a copolyester of ethylene terephthalate units and other units derived from an alkylene glycol or aryl glycal with an aliphatic or aryl dicarboxylic acid.

Polyethylene terephthalate can be manufactured by reacting a diacid or diester component comprising at least 60 mole % terephthalic acid or C1-C4 dialkylterephthalate, or at least 70 mole % or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the dial component is ethylene glycol. The mole percentage for all the diacid component(s) totals 100 mole %, and the mole percentage for all the diol component(s) totals 100 mole %.

As used herein, a "$d_{50}$ particle size" is the median diameter, where 50% of the volume is composed of particles larger than the stated value, and 50% of the volume is composed of particles smaller than the stated $d_{50}$ value. As used herein, the median particle size is the same as the $d_{50}$ particle size.

Said compound of tungsten and oxygen preferably comprises particles of tungsten and oxygen, referred to herein as tungsten oxide particles.

Said tungsten oxide particles suitably have a $d_{50}$ of less than 50 µm, preferably less than 25 µm, more preferably less than 10 µm and especially, 5 µm or less. In some embodiments, said particles may have a $d_{50}$ of less than 2 µm. The $d_{50}$ of said particles may be greater than 0.1 µm or greater than 0.5 µm. The $d_{50}$ may be measured as described herein.

Preferably, less than 5 vol %, less than vol % or less than 1 vol % of said tungsten oxide partides have a particle size measured as described herein of more than 100 µm. Suitably, less than 5 vol % of said tungsten oxide particles have a particle size of more than 10 µm. Suitably, more than 5 vol %, preferably more than 25 vol %, more preferably more than 50 vol %, especially more than 75 vol % of said tungsten oxide particles have a particle size of more than 0.40 µm, preferably of more than 0.30 µm.

The particle size distribution may be expressed by "span (S)," where S is calculated by the following equation:

$$S=(d_{90}-d_{10})/d_{50}$$

where $d_{90}$ represents a particle size in which 90% of the volume is composed of particles having a smaller diameter than the stated $d_{90}$; and $d_{10}$) represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value, and 50% of the volume is composed of particles having a diameter smaller than the stated $d_{50}$ value.

Particle size distributions of tungsten oxide particles in which the span (S) is from 0.01 to 10, or from 0.01 to 5, or from 0.1 to 3, for example, may be preferred, The impact of the tungsten oxide particles on the odour of a polymer, for example polyester, composition may be assessed using the CIE L*a*b* scale, where L* ranges from 0 to 100 and measures dark to light. The colour may be assessed as described herein. Said article (especially said preform) suitably has L* of at least 65, preferably at least 70, more preferably at least 75. It suitably has a b* of less than 2.0, preferably less than 1.0, more preferably less than 0.5. The b* may be greater than −1.0, preferably greater than −0.75. The b* may be in the range 1.0 to −1.0. The a* may be in the range −1 to 0.

Said article (especially said preform) may include at least 5 ppm, at least 10 ppm or at least 20 ppm (and suitably less than 100 ppm or less than 50 ppm) tungsten oxide particles and the L* may be at least 70 or at least 75; and may be less than 85 or 82.

Said polymer, for example polyester, composition (and consequently the article (especially said preform)) suitably has improved reheat properties—it may reheat faster and/or with application of less reheat energy and so may have increased reheat efficiency. Advantageously, the improvement in reheat properties may be achieved whilst maintaining appropriate optical properties, for example L*.

In an especially preferred embodiment, said article (especially said preform) comprises, (preferably consists essentially) of said polyester composition and said polyester composition comprises more than 98 wt % (especially more than 99 wt %) of a polyester polymer and 5 to 150 ppm (especially 10 to 50 ppm) of said tungsten oxide particles, wherein preferably said polyester polymer consists essentially of PET and wherein preferably the sum of the wt % of tungsten and oxygen moieties in said tungsten oxide particles is at least 99.5 wt % and the particles include 18.86 to 20.64 wt % oxygen. The balance of material in said polyester composition may be made up of other additives, for example toners, acetaldehyde scavengers, processing aids, crystallization aids, impact modifiers, surface lubricants, stabilizers, anti-oxidants, ultraviolet light absorbing agents and catalyst deactivators. In addition, when a dispersion comprising a polyester-compatible vehicle and tungsten oxide particles is added to polyester polymer to prepare the polyester composition of said preform, said polyester composition may also include residual vehicle.

Said additional additive in said polymer composition of paragraph (A) may be selected from 10 to 1000 ppm (for example 50 to 500 ppm) of said acetaldehyde scavengers and 50 to 4000 ppm (for example 100 to 4000 ppm) of colourants. Said additional additive may include more than one acetaldehyde scavenger or colourant in which case the amounts refer to the total amount of acetaldehyde scavengers and colourants.

Preferred acetaldehyde scavengers include one or more nitrogen atoms. Preferably, the nitrogen atoms are not bonded to other atoms by double or triple bonds, but are preferably bonded to three other atoms by single bonds. Preferred scavengers include amine moieties. Preferred amine moieties are primary and secondary amine moieties. Especially preferred are scavengers which include a —$NH_2$ moiety.

In one embodiment, preferred acetaldehyde scavengers include both amine moieties as described and amide moieties. In one embodiment, preferred acetaldehyde scavengers include a substituted phenyl moiety. In one preferred embodiment, a said acetaldehyde scavenger may include an amine moiety (especially —$NH_2$), an amide moiety (especially —$CONH_2$) and a substituted phenyl moiety. In this case, it is preferred that both the amine moiety and the amide moiety are directly bonded to the phenyl moiety. Preferably, the amine moiety and amide moiety are bonded ortho to one another.

One class of acetaldehyde scavengers may be as described in U.S. Pat. No. 5,340,884 (Eastman), the content of which as regards the scavengers is incorporated herein by reference. In this case, the scavenger may be a polyamide. Such a polyamide may be selected from the group consisting of low molecular weight partially aromatic polyamides having a number average molecular weight of less than 15,000, low molecular weight aliphatic polyamides having a number average molecular weight of less than 7,000, and combinations thereof. Preferred low molecular weight partially aromatic polyamides include: poly(m-xylylene adipamide), poly(hexamethylene isophthalamide), poly(hexamethylene adipamide-co-isophthalamide), poly(hexamethylene adipamide-co-terephthalamide), and poly(hexamethylene isophthalamide-co-terephthalamide). The most preferred low molecular weight partially aromatic polyamide poly(m-xylylene adipamide) having a number average molecular weight of 4,000 to 7,000 and an inherent viscosity of 0.3 to 0.6 dL/g. Preferred low molecular weight aliphatic polyamides include poly(hexamethylene adipamide) and poly(caprolactam). The most preferred low molecular weight aliphatic polyamide is poly(hexamethylene adipamide) having a number average molecular weight of 3,000 to 6,000 and an inherent viscosity of 0.4 to 0.9 dL/g.

Another class of acetaldehyde scavengers may be as described in U.S. Pat. No. 6,762,275 (Coca-Cola), the content of which as regards the scavenger is incorporated herein by reference. In this case, the scavenger may include at least two component molecular fragments, each component molecular fragment comprising at least two hydrogen substituted heteroatoms bonded to carbons of the respective component molecular fragment. The component molecular fragments of the organic additive compound are each reactive with acetaldehyde in a polyester to form water and a resulting organic molecular fragment comprising an unbridged five or six member ring including the at least two heteroatoms. Preferably, the organic additive compounds have at least twice the molecular weight of the component molecular fragments alone. The heteroatoms present in each molecular fragment capable of reacting with acetaldehyde include oxygen (O), nitrogen (N), and sulfur (S). The heteroatoms of the component molecular fragments suitably have at least one bond to an active hydrogen (H), and in the course of condensing with acetaldehyde should split off water. Preferred functional groups containing these heteroatoms include amine (NH2 and NHR), hydroxyl (OH), carboxyl (CO2H), amide (CONH2 and CONHR), sulfonamide (SO2NH2), and thiol (SH). It is necessary for these functional groups to be sterically arranged so that on condensation with AA an unbridged 5 or 6 member ring can be formed. It is preferred that the structural arrangement allows the formation of a six membered ring. It is especially preferred that heteroatoms of the organic additive are attached to a preformed ring rings. It is most preferred that the preformed ring(s) are aromatic so that the unbridged 5 or 6-member ring of the resulting organic compound is bonded to the aromatic ring. Suitable organic additive compounds may be substantially thermally stable at the temperatures required for melt-processing the polyester. It is also preferred that the functional groups present on the organic additive are relatively unreactive towards the ester linkages present in polyesters. Examples of preferred scavengers include 1,2-bis(2-aminobenzamidoyl)ethane; 1,2-bis(2-aminobenzamidoyl)propane; 1,3-bis(2-aminobenzamidoyl)propane; 1,3-bis(2-aminobenzamidoyl)pentane; 1,5-bis(2-aminobenzamidoyl)hexane; 1,6-bis(2-aminobenzamidoyl) hexane; and 1,2-bis(2-aminobenzamidoyl)cyclohexane. More preferred are scavengers where the component molecular fragments are derived from anthranilamide, because of their low cost, efficacy, and ease of incorporation into PET.

An especially preferred scavenger of said class is 1,6-bis (2-aminobenzamidoyl hexane).

Another group of acetaldehyde scavengers suitable for use in the present invention include Anthranilamide, 1,8-diaminonaphalene, Allantoin, 3,4-diaminobenzoic acid, Malonamide, Salicylanilide, 6-amino-1,3-dimethyluracil (DMU), 6-Aminoisocytosine, 6-Aminouracil, 6-Amino-1-methyluracil, α-tocopherol, triglycerin, trimethylolpropane, dipentaerythritol, tripentaerythritol, D-mannitol, D-sorbitol, and xylitol. From the aforementioned group. Anthranilamide, 1,8-diaminonaphalene, Allantoin, 3,4-diaminobenzoic acid, Malonamide, Salicylanilide, 6-amino-1,3-dimethyluracil (DMU), 6-Aminoisocytosine, 6-Aminouracil, 6-Amino-1-methyluracil are preferred.

In another embodiment, said acetaldehyde scavenger may comprise a hydroxylic compound selected from aliphatic hydroxylic compounds containing at least two hydroxyl groups, aliphatic-cycloaliphatic compounds containing at least two hydroxyl groups, and cycloaliphatic hydroxylic compounds containing at least two hydroxyl groups.

The hydroxylic compounds preferably contain from 3 to about 8 hydroxy groups. They may contain one or more substituents, such as ether, carboxylic acid, carboxylic acid amide or carboxylic acid ester groups.

Preferred hydroxylic compounds include those having a pair of hydroxyl groups which are attached to respective carbon atoms which are separated one from another by at least one atom. Especially preferred hydroxylic compounds are those in which a pair of hydroxyl groups are attached to respective carbon atoms which are separated one from another by a single carbon atom.

As examples of suitable hydroxylic compounds there can be mentioned diols such as ethylene glycol, propane-1,2-diol, propane-1,3-diol, butane-1,4-diol, pentane-1,5-diol, hexane-1,2-diol, 2-methylpentane-2,4-diol, 2,5-dimethyl-hexane-2,5-diol, cyclohexane-1,2-diol, cyclohexane-1,1-dimethanol, diethylene glycol, triethylene glycol, and polyethylene glycols having, for example, a molecular weight from about 800 to at 2000, such as Carbowax™ 1000 which has a molecular weight of about 950 to about 1050 and contains from about 20 to about 24 ethyleneoxy groups per molecule; triols, such as glycerol, trimethylolpropane, 2,3-di-(2'-hydroxyethyl)-cyclohexan-1-ol, hexane-1,2,6-triol, 1,1,1-tris(hydroxymethyl) ethane, 3-(2'-hydroxyethoxy)-propane-1,2-diol, 3-(2'-hydroxypropoxy)-propane-1,2-diol, 2-(2'-hydroxyethoxy)-hexane-1,2-diol, 6-(2'-hydroxypropoxy)-hexane-1,2-diol, 1,1,1-tris-[(2'-hydroxyethoxy)-methyl]-ethane, 1,1,1-tris-[(2'-hydroxypropoxy)-methyl]-propane, 1,1,1-tris-(4'-hydroxyphenyl)-ethane, 1,1,1-tris-(hydroxyphenyl)-propane, 1,1,3-tris-(dihydroxy-3-methylphenyl)-propane, 1,1,4-tris-(dihydroxyphenyl)-butane, 1,1,5-tris-(hydroxyphenyl)-3-methylpentane, trimethylolpropane ethoxylates of the formula:

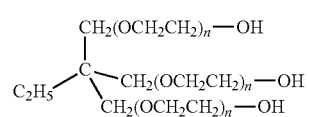

in which n is an integer, or trimethylolpropane propoxylates of the formula:

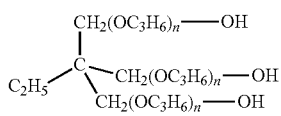

in which n is an integer, for example a trimethylolpropane, propoxylate which has a molecular weight of about 1000; polyols such as pentaerythritol, dipentaerythritol, and tripentaerythritol; and saccharides, such as cyclodextrin, D-mannose, glucose, galactose, sucrose, fructose, xylose, arabinose, D-mannitol, D-sorbitol, D- or L-arabitol, xylitol, iditol, talitol, allitol, altritol, guilitol, erythritol, threitol, and D-gulonic-Y-lactone; and the like. Mixtures of two or more such compounds can be used. Especially preferred are aliphatic hydroxylic compounds which contain from 3 to about 8 hydroxy groups.

When said polymer composition includes a colourant, said colourant may be blue or green. Said colourant may be selected from phthalocyanines, anthraquinones and inorganic pigments.

When said article is a sheet, said polymeric composition may comprise tungsten oxide particles and a polycarbonate, a polyolefin or a polyester. The tungsten oxide particles may be as described above.

When said article is a sheet, said sheet may have a width in the range 0.3 m to 2 m. The thickness of the sheet may be in the range 50 µm to 10 mm.

Said article may be part of a collection which comprises at least ten, preferably at least twenty, more preferably at least fifty of said articles, wherein, preferably, all of the articles in said collection are substantially identical. Said collection may comprise a transportation receptacle in which the articles may be packaged for transportation. When said article is a preform for a container, at least ten, preferably at least twenty, of said preforms may be arranged within said transportation receptacle, wherein suitably all preforms in said receptacle have substantially the same dimensions. When said article is a sheet, said collection may comprise at least five sheets (preferably at least ten sheets) in a stack, suitably wherein sheets make face to face contact and suitably said sheets have substantially the same dimensions. The invention extends to a motorised vehicle carrying said collection of preforms or sheets referred to.

According to a second aspect of the invention, there is provided a finished article selected from a packaging container and a thermoformed article, said finished article comprising a polymer composition (especially a polyester composition) which includes a compound of tungsten and oxygen (especially tungsten oxide particles) and an additional additive, wherein said additional additive is selected from en acetaldehyde scavenger and a colourant, wherein when said polymer composition includes an acetaldehyde scavenger, said polymer composition includes at least 10 ppm (suitably at least 25 ppm, preferably at least 50 ppm) of said acetaldehyde scavenger and when said polymer composition includes a colourant, said polymer composition includes at least 50 ppm (suitably at least 75 ppm, preferably at least 100 ppm) of said colourant, wherein when said finished article is a thermoformed article, said thermoformed article comprises a material having a thickness of 50 µm to 10 mm which comprises said polymer composition.

The polymer (e.g. polyester) composition and tungsten oxide particles may be as described according to the first aspect. The packaging container or thermoformed article may be made from an article of the first aspect and/or as described according to the third aspect.

When, as is preferred, the invention relates to a packaging container, said packaging container is suitably a bottle, for example a beverage bottle such as one suitable for holding carbonated drinks and/or alcoholic beverages. The bottle may be a substantially clear bottle suitably for containing water.

Said finished article may be part of a collection, which comprises at least ten, preferably at least twenty, more preferably at least fifty of said finished articles wherein, preferably, all of the finished articles in said collection are substantially identical. Said collection may comprise a transportation receptacle in which the finished articles are packaged for transportation. Said transportation receptacle may contain at least six, preferably at least ten, of said finished articles. When said transportation receptacle includes finished, articles in the form of packaging containers, at least ten of said finished articles are suitably provided having substantially identical dimensions; and when said transportation receptacle includes finished articles in the form of thermoformed articles, at least ten of said finished articles are suitably provided having substantially identical dimensions.

According to a third aspect of the invention, there is provided a method of making a finished article according to the second aspect, for example an article selected from a packaging container and a thermoformed sheet which comprises:

(i) selecting an article according to first aspect;
(ii) heating the article and subjecting it to blow-molding, thereby to make a packaging container; or subjecting it to thermoforming to make a thermoformed article.

The method may comprise making at least fifty of said finished articles.

The method suitably comprises heating using infrared heaters, suitably having wavelengths in the range 500 nm to 1500 nm. The method preferably comprises heating the article (especially preform) above the glass transition temperature of a polymer (e.g. polyester) included in the composition. In the case of a preform, the method may include positioning the preform in a mould, and allowing pressurized gas (e.g. air) through the open end of the mould.

A said packaging container may define a volume in the range 100 ml to 1500 ml.

According to a fourth aspect, there is provided a method of making an article selected from a preform for a container or a sheet according to the first aspect, the method comprising thermally treating a polymer composition (especially a polyester composition) which includes a compound of tungsten and oxygen (especially tungsten oxide particles) and an additional additive, wherein said additional additive is selected from an acetaldehyde scavenger and a colourant, wherein when said polymer composition includes an acetaldehyde scavenger, said polymer composition includes at least 10 ppm (suitably at least 25 ppm, preferably at least 50 ppm) of said acetaldehyde scavenger and when said polymer composition includes a colourant, said polymer composition includes at least 50 ppm (suitably at least 75 ppm, preferably at least 100 ppm) of said colourant.

The polyester composition and/or tungsten oxide particles may be as described according to the first aspect.

The method is preferably for making a preform for a packaging container which comprises injection moulding a polyester composition including tungsten oxide particles in order to define the preform.

The method may comprise feeding a molten or solid bulk polyester and a liquid, molten or solid polyester concentrate composition to a machine for manufacturing the preform, the concentrate composition comprising tungsten oxide particles to obtain a preform having from about 5 ppm to about 150 ppm tungsten oxide particles, based on the weight of the polyester preform.

Alternatively, the preform may be made by selecting a polyester composition, for example in pellet or granule form, which includes tungsten oxide particles dispersed in a polyester polymer; and injection moulding the polyester composition.

According to a fifth aspect, there is provide the use of a compound of tungsten and oxygen (especially tungsten oxide particles) for improving reheat characteristics of a polymer composition (especially a polyester polymer) and/or a preform or sheet comprising a polymer composition (especially a polyester composition), wherein:

(I) said polymer composition includes an additional additive, wherein said additional additive is selected from an acetaldehyde scavenger and a colourant, wherein when said polymer composition includes an acetaldehyde scavenger; said polymer composition includes at least 10 ppm (suitably at least 25 ppm, preferably at least 50 ppm) of said acetaldehyde scavenger and when said polymer composition includes a colourant, said polymer composition includes at least 50 ppm (suitably at least 75 ppm, preferably at least 100 ppm) of said colourant, and wherein tungsten oxide particles; or (II) said polymer composition is in the form of a sheet which has a width of at least 0.3 m.

The polymer and/or polyester composition may be as described according to the first aspect.

Improved reheat may mean that inclusion of said tungsten oxide particles leads to increased reheat rate or with less reheat energy (increased reheat efficiency) or both compared to the same polymer and/or polymer composition in the absence of said tungsten oxide.

According to a sixth aspect, there is provided a polymer composition (especially a polyester composition) which includes a compound of tungsten and oxygen (especially tungsten oxide particles) and an additional additive, wherein said additional additive is selected from an acetaldehyde scavenger and a colourant, wherein when said polymer composition includes an acetaldehyde scavenger, said polymer composition includes at least 10 ppm (suitably at least 25 ppm, preferably at least 50 ppm) of said acetaldehyde scavenger and when said polymer composition includes a colourant, said polymer composition includes at least 50 ppm (suitably at least 75 ppm, preferably at least 100 ppm) of said colourant.

The polymer and/or polyester composition may be as described according to the first aspect.

Preferably, there is provided at least 1 Kg, suitably at least 10 Kg of said polymer composition. There may be provided less than 1000 Kg of said polymer composition.

According to a seventh aspect, there is provided a method of making a polyester composition according to the sixth aspect, the method comprising:

an esterification step comprising transesterifying a dicarboxylic acid diester with a diol, or directly esterifying a dicarboxylic acid with a diol, to obtain one or more of a polyester monomer or a polyester oligomer;

a polycondensation step comprising reacting the one or more of a polyester monomer or a polyester oligomer in a polycondensation reaction in the presence of a polycondensation catalyst to produce a polyester polymer suitably having an It.V, from about 0.50 dL/g to about 1.1 dL/g;

a particulation step in which the molten polyester polymer is solidified into particles;

an optional solid-stating step in which the solid polymer is polymerized, suitably to an It.V. from about 0.55 dL/g about 1.2 dL/g; and a particle addition step comprising adding and dispersing tungsten oxide particles to provide a dispersion of tungsten oxide in the polyester polymer, wherein the particle addition step occurs before, during, or after any of the preceding steps.

Preferably, in the method, at least 1 Kg, suitably at least 10 Kg, preferably at east 100 Kg of said polyester composition is prepared. At least 500 particles (e.g. at least 10,000 particles) may be prepared in said particulation step.

The method may include incorporating said additional additive of the first aspect before, during or after addition of said tungsten oxide particles.

The It.V may be measured as described in WO2007/064312 from page 23, line 8 to page 24, line 15 and the content of the aforementioned is incorporated by reference.

The process may further comprise a forming step, following the solid-stating step, the forming step comprising melting and extruding the resulting solid polymer to obtain a preform having the tungsten oxide particles dispersed therein. The particle addition step may occur during or after the solid-stating step and prior to the forming step. The particle addition step may comprise adding the tungsten oxide particles as a thermoplastic concentrate prior to or during the forming step, the thermoplastic concentrate comprising the tungsten oxide particles in an amount from about 100 ppm to about 5,000 ppm, with respect to the weight of the thermoplastic concentrate. The particles sizes of the tungsten oxide particles may be as described above for said preform.

The particle addition step may be carried out prior to or during the polycondensation step; or prior to or during the particulation step; or prior to or during the solid-stating step; or prior to or during the forming step.

A said dicarboxylic acid may comprise terephthalic acid. A said dicarboxylic acid diester may comprise dimethyl terephthalate. A said diol may comprise ethylene glycol. Alternatively, a said dicarboxylic acid may comprise naphthalene dicarboxylic acid.

A thermoplastic concentrate may comprise: tungsten oxide particles, in an amount ranging from about 0.01 wt. % up to about 35 wt. % based on the weight of the thermoplastic concentrate; and a thermoplastic polymer (suitably a polyester), in an amount of at least 65 wt. % based on the weight of the thermoplastic concentrate.

In one preferred embodiment, tungsten oxide particles may be dispersed in one of the monomers used in the method. Preferably, in this case, the tungsten oxide particles are dispersed in the terephthalic acid which is reacted in an esterification reaction.

According to an eighth aspect, there is provided a liquid formulation comprising a carrier which is compatible with a polymer (e.g. polyester) and a compound of tungsten and oxygen (especially tungsten oxide particles) dispersed in the carrier, at least 1 litre of said liquid formulation being provided in a container.

Said container may include at least 5 litres of said liquid formulation. Said container may include less than 100 litres of said liquid formulation.

The compound of tungsten and oxygen (especially tungsten oxide particles) may be as described according to any of the preceding aspects.

Said carrier may be a liquid and may be a vegetable or mineral oil or a glycol. A particularly preferred glycol is ethylene glycol, especially if the particles of tungsten oxide are to be added to materials used in PET polymerization. The tungsten oxide may be milled in the carrier, suitably to break down any agglomerates into primary particles.

Said tungsten oxide particles suitably have a $d_{50}$ of less than 50 µm, preferably less than 25 µm, more preferably less than 10 µm and, especially, 5 µor less. In some embodiments, said particles may have a $d_{50}$ of less than 2 µm. The $d_{50}$ of said particles may be greater than 0.1 µm or greater than 0.5 µm. The $d_{50}$ may be measured as described herein.

Preferably, less than 5 vol %, less than 3 vol % or less than 1 vol % of said tungsten oxide particles in said carrier have a particle size measured as described herein of more than 100 µm. Suitably, less than 5 vol % of said tungsten oxide particles have a particle size of more than 10 µm. Suitably, more than 5 vol %, preferably more than 25 vol %, more preferably more than 50 vol %, especially more than 76 vol % of said tungsten oxide particles have a particle size of more than 0.40 µm, preferably of more than 0.30 µm.

At least 90 wt %, preferably at least 95 wt % of said tungsten oxide particles in the formulation are in the form of dispersed primary particles. Suitably, less than 10 wt %, more preferably less than 5 wt % of said tungsten oxide particles are components of agglomerates. Preferably, said liquid formulation is substantially free of agglomerates of tungsten oxide particles.

According to a ninth aspect, there is provided a method of making a liquid formulation of the eighth aspect, the method comprising:

(i) contacting a carrier according to the eighth aspect with a compound of tungsten and oxygen (especially tungsten oxide particles) to form a mixture;

(ii) treating the mixture to break down agglomerates of said tungsten oxide particles and thereby produce said liquid formulation.

Suitably, the treatment does not significantly reduce the size of the primary particles of said tungsten oxide particles. Said treatment may comprise milling the mixture.

Specific embodiments of the invention will now be described, by way of example, with reference to the accompanying figures in which.

Figure 1:
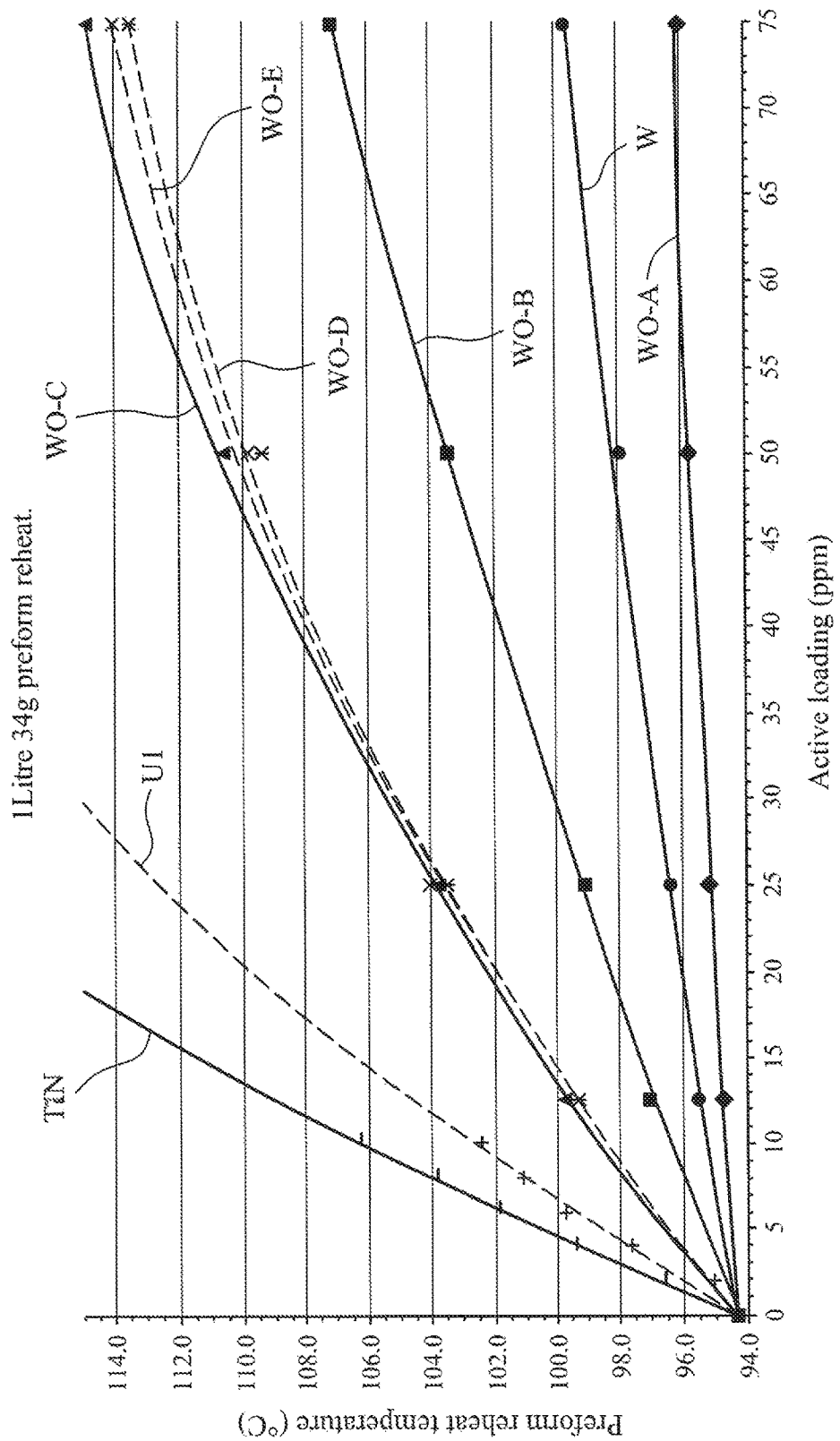
FIG. 1 is a graph of preform reheat temperature v. active loading for a series of additives.

The following materials are referred to hereinafter:
WO-A—tungsten oxide (oxygen content 20.70%)
WO-B—tungsten oxide (oxygen content 20.64%)
WO-C—tungsten oxide (oxygen content 19.71%)
WO-D—tungsten oxide (oxygen content 10.32%)
Tungsten material (W)—oxygen content less than 500 ppm
WO-E—tungsten oxide (oxygen content 18:86%)

The aforementioned materials are commercially available. Unless otherwise stated, the reductive state and levels of oxygen described herein are evaluated applying ASTM E159-10 Standard Test Method for Loss Mass in Hydrogen for Cobalt, Copper, Tungsten and Iron Powders.

Unless otherwise stated, the particle sizes described herein were examined using a Beckman Coulter LS230 Laser Diffraction Particle Size Analyzer, fitted with a Micro Volume Module filled with dichloromethane. The samples were pre-diluted in mineral oil before addition to the module.

Titanium nitride—commercially available titanium nitride reheat additive.

C93—a polyester control material which includes no reheat additive.

U1—activated carbon reheat additive sold by Polytrade, having D50=<0.5 µm and a maximum particle size of 2 µm.

Optical, for example L*a*b*, data for preforms was measured in transmittance using a Minolta CM-3700d spectrophotometer (D65 illumination 10° observer, specular included, UV included) linked to an IBM compatible PC. Tests are undertaken using a standard preform holder supplied by Minolta.

All tungstate powders evaluated were prepared into dispersions of active powder in a carrier system compatible with the polymer host. The carrier has no influence on host polymer colour, transmission or haze values at the levels used when moulded parts were transmission measured in their amorphous state. The carrier also has no impact on the reheat behavior of moulded preforms.

EXAMPLE 1

Preparation of Preforms

Liquid dispersions comprising the reheat additives in a carrier medium were formulated and added at the throat of an injection moulding machine onto dry C93 polymer. Preforms were then made from the polymer, using a 160-ton HUSKY injection moulding machine which made two preforms per shot. The injection moulding was conducted at 285° C. Each preform weighed approximately 35 grams and was cylindrical, approximately 105 mm in length with a screw top base and 3.7 mm side wall thickness. The preforms could be blown into one litre bottles with a petaloid base.

EXAMPLE 2

Method for Assessing Reheat

Preforms for all samples/batches are stored in the same area and are allowed to condition for at least 24 hours to ensure that all the preforms being tested are of the same starting temperature.

Standard settings are entered into a Sidel SB-01 stretch blow moulding machine. The machine houses two banks of ovens each bank containing 9×1500 W+1×2000 watt infra red heating lamps, 10 lamps per oven 20 lamps in total.

A set throughput rate is entered which is 1000 b/p/h (bottles per hour). At this production rate the preforms take approximately 45 seconds to pass through the ovens. As the preforms pass through the ovens they are automatically rotated at a constant rate so the entire outside surface of the preforms are equally exposed to the oven lamps.

The machine heating coefficient is switched off (this is a function that when active automatically controls the energy supplied to the oven lamps in an attempt to guide the preform reheat temperature to a predetermined set point) as a set amount of I.R. energy is supplied to every preform so there is no bias.

Each lamp is set at 60% power and a master energy setting that controls the power to every lamp is also set to 60%. At these conditions the oven lamps are all operating at 60% of 60% of their maximum operating ability.

After the preforms pass through the ovens there is approximately a 3 second conditioning period (no I.R. energy exposure) before they pass an infra red camera that measures the preform surface temperature. The camera is connected to a data capture station which records all preform surface temperatures as they pass by.

A minimum of five preforms from a batch are tested and an average reheat figure gained. Preforms representing each batch are entered into the machine in a staggered formation so no one batch gains any bias. By way of example, if a comparison is to be drawn of the reheat behaviour of three different resins (A, B and C), a minimum of 5 preforms produced from each resin would be selected for reheat testing and the preforms would be entered into the machine in a random order (e.g. A-C-B-B-C-C-A-C-B-A-C-A-A-B-B, not all A's, then B's then C's). An average reheat figure would then be gained for each set of preforms.

The reheat improvement (defined as a temperature attained by the test preform minus the temperature attained by a C93 control (i.e. not containing any reheat additive)) was calculated.

Various evaluations on the materials referred to were undertaken as described in the following examples to establish the reheat material with the best combination of properties.

EXAMPLE 3

Comparison of Reheat v. Active Loading

The preform reheat temperature v. active loading was assessed for various tungsten oxides of different stoichiometries and for commercially available titanium nitride and activated carbon (U1) materials. The results are provided in FIG. 1.

Referring to FIG. 1, the results show that, of the tungsten samples evaluated, WO-C returned the best reheat v. active loading. TiN returned the best reheat performance per ppm active loading, with U1 between TiN and the best tungsten oxides.

EXAMPLE 4

Comparison of Light Transmission v. Active Loading

Figure 2:
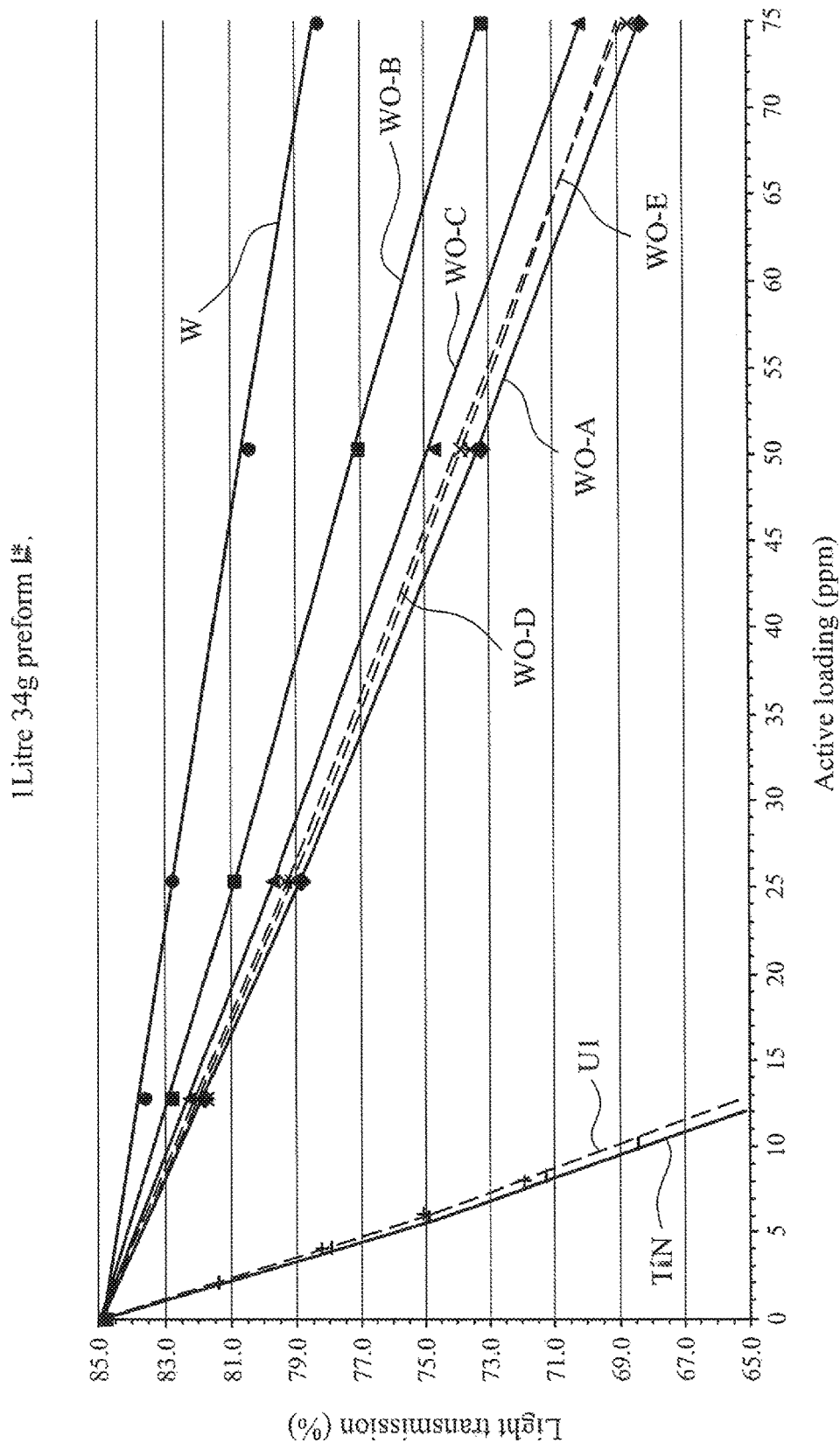
FIG. 2 is a graph of light transmission v. active loading for a series of additives.

The preform light transmission v. active loading for various materials was assessed and the results are provided in FIG. 2.

Although as referred to in Example 3, TiN has the best reheat performance per ppm of active loading, it is clear from FIG. 2 that it has the greatest impact on preform light transmission. It will be appreciated that the amount of a reheat additive which can be used in a preform is dependent upon how the additive affects polymer aesthetics. From FIG. 2, it is clear that WO-C has the best reheat per ppm additive (FIG. 1) and it does not block as much transmitted light as the WO-E or WO-D (FIG. 2).

EXAMPLE 5

Comparison of Preform a* and b* v. Active Loading

In addition to the factors evaluated as described in Examples 3 and 4, it is also desirable for a reheat additive not to adversely affect the polymer's a* and b* colour. It may also be desirable for the additive to impart a neutral or slightly positive (i.e. red) effect on a*, and a slightly negative (i.e. blue) effect on b*. Such attributes would give the active toning properties.

Figure 3:
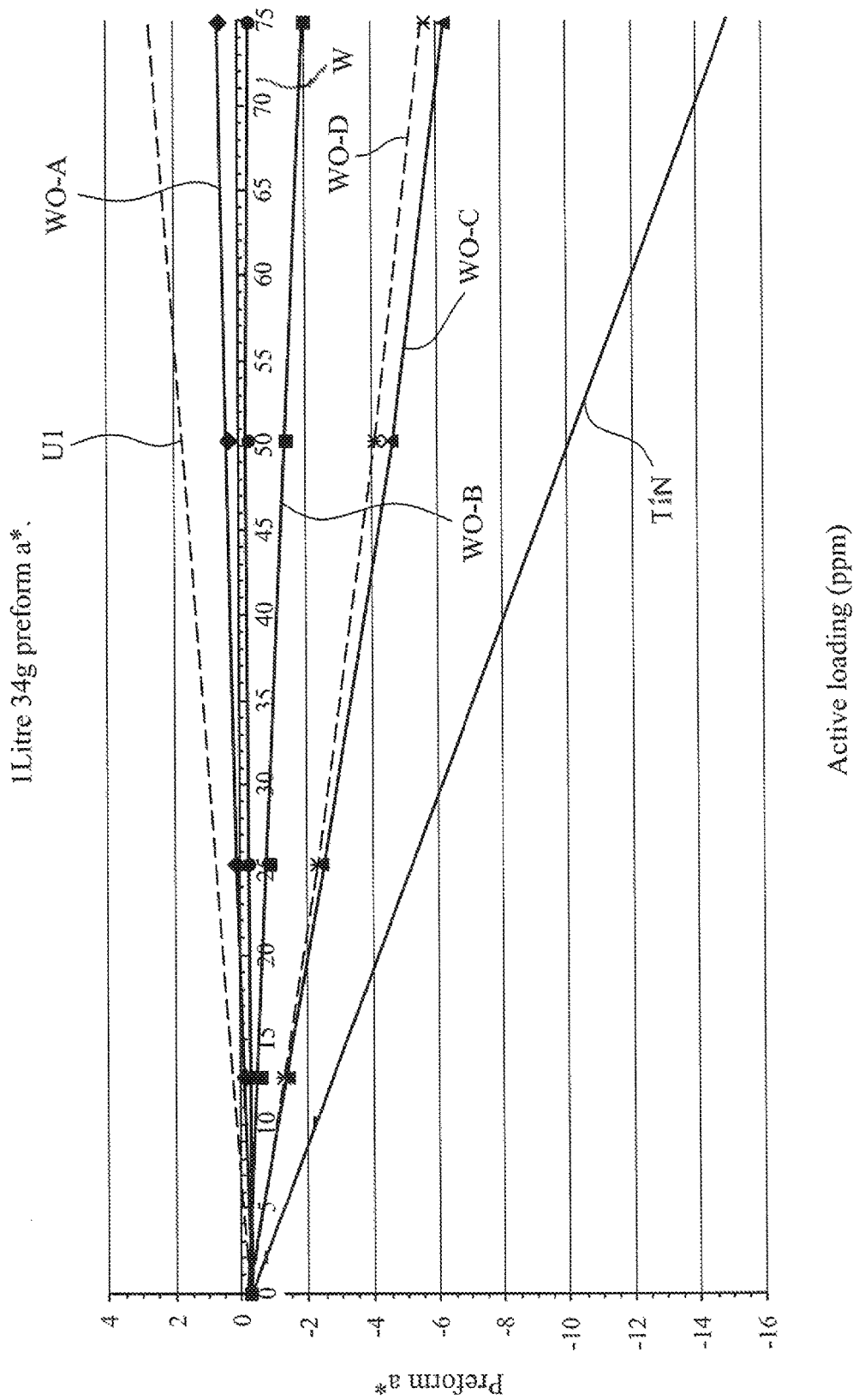
FIG. 3 is a graph of preform a* v. active loading for a series of additives.
Figure 4:
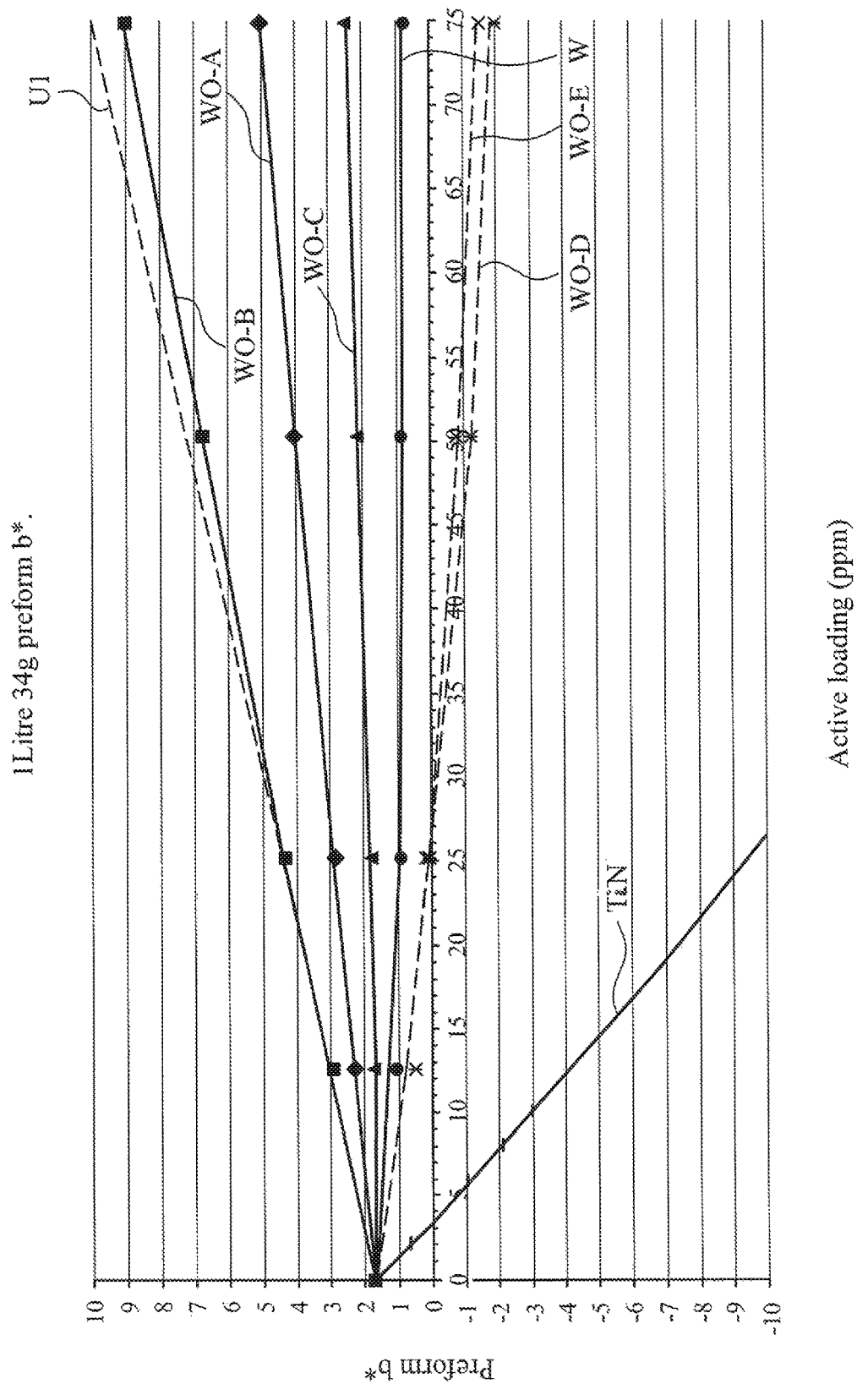
FIG. 4 is a graph of preform b* v. active loading for a series of additives.

FIGS. 3 and 4 provide results for preform a* v active loading and preform b* v. active loading respectively. From the Figures, it is noted that, of the tungsten-based materials, it is the tungsten metal, the WO-A and the WO-B, which provide the best influence on a*, however, these materials return the worst reheat performance. The b* results show that, although WO-E and WO-D give the preferred blue toning effect, their detrimental impact on general light transmission is greater than for the WO-C sample. It will be noted that the WO-C has a relatively neutral effect on b*, has a very similar influence on a* and has the best reheat uptake performance in comparison to the WO-D end WO-E materials. WO-C therefore appears to be the best all round performer.

Results used to compile FIGS. 1 to 4 are summarised in Table 1. D65 is a standard light source.

TABLE 1

|  | L*(D65) | a* (D65) | b* (D65) | Reheat | Efficacy | Efficacy average |
|---|---|---|---|---|---|---|
| C93 Control | 84.78 | −0.28 | 1.71 | 94.33 | N/A | N/A |
| WO-A-12.5 ppm | 81.96 | −0.09 | 2.23 | 94.64 | 0.11 | 0.11 |
| WO-A-25 ppm | 78.97 | 0.03 | 2.87 | 95.07 | 0.13 | |
| WO-A-50 ppm | 73.35 | 0.32 | 4.07 | 95.69 | 0.12 | |
| WO-A-75 ppm | 68.36 | 0.53 | 5.05 | 95.90 | 0.10 | |
| WO-B-12.5 ppm | 82.80 | −0.56 | 3.01 | 97.00 | 1.35 | 1.21 |
| WO-B-25 ppm | 80.93 | −0.91 | 4.39 | 98.97 | 1.20 | |
| WO-B-50 ppm | 77.11 | −1.49 | 6.76 | 103.39 | 1.18 | |
| WO-B-75 ppm | 73.36 | −1.94 | 9.00 | 106.99 | 1.11 | |
| WO-C-12.5 ppm | 82.29 | −1.44 | 1.72 | 99.77 | 2.19 | 1.81 |
| WO-C-25 ppm | 79.74 | −2.55 | 1.84 | 103.74 | 1.87 | |
| WO-C-50 ppm | 74.72 | −4.66 | 2.15 | 111.50 | 1.71 | |
| WO-C-75 ppm | 70.17 | −6.32 | 2.47 | 115.83 | 1.47 | |
| WO-E-12.5 ppm | 81.71 | −1.38 | 0.56 | 99.27 | 1.61 | 1.44 |
| WO-E-25 ppm | 79.17 | −2.55 | 0.12 | 102.99 | 1.54 | |
| WO-E-50 ppm | 73.73 | −4.61 | −0.79 | 109.64 | 1.39 | |
| WO-E-75 ppm | 68.74 | −6.33 | −1.54 | 114.04 | 1.23 | |
| WO-D-12.5 ppm | 81.85 | −1.44 | 0.77 | 99.46 | 1.75 | 1.52 |
| WO-D-25 ppm | 79.35 | −2.36 | 0.01 | 103.77 | 1.74 | |
| WO-D-50 ppm | 73.89 | −4.13 | −1.14 | 109.40 | 1.38 | |
| WO-D-75 ppm | 68.76 | −5.72 | −1.91 | 113.54 | 1.20 | |
| W-12.5 ppm | 83.61 | −0.38 | 1.08 | 95.49 | 0.99 | 0.92 |
| W-25 ppm | 82.84 | −0.27 | 0.96 | 96.36 | 1.04 | |
| W-50 ppm | 80.55 | −0.31 | 0.85 | 97.86 | 0.83 | |
| W-75 ppm | 78.34 | −0.33 | 0.73 | 99.64 | 0.83 | |
| U1-2 ppm | 81.37 | −0.22 | 1.69 | 95.01 | 0.20 | 0.46 |
| U1-4 ppm | 78.21 | −0.13 | 2.05 | 97.64 | 0.50 | |
| U1-6 ppm | 75.06 | −0.04 | 2.28 | 99.71 | 0.55 | |
| U1-8 ppm | 72.07 | 0.01 | 2.51 | 101.07 | 0.53 | |
| U1-10 ppm | 69.10 | 0.11 | 2.72 | 102.41 | 0.52 | |
| TiN-2 ppm | 81.34 | −0.74 | 0.66 | 96.54 | 0.64 | 0.71 |
| TiN-4 ppm | 77.89 | −1.15 | −0.26 | 99.37 | 0.73 | |
| TiN-6 ppm | 74.89 | −1.53 | −1.02 | 101.86 | 0.76 | |
| TiN-8 ppm | 71.26 | −1.92 | −2.02 | 103.84 | 0.70 | |
| TiN-10 ppm | 68.41 | −2.23 | −2.95 | 106.23 | 0.73 | |

EXAMPLE 6

A relevant indication of the influence a reheat additive has upon a base polymer is to evaluate how it has affected the host polymers L* v. reheat efficacy. Efficacy values (which compare the effect of an additive on polymer reheat against its impact on L*) are quoted in Table 1.

The values are calculated as follows:

$$\text{Polymer efficacy} = \frac{\left(\begin{array}{c}\text{preform containing additive reheat value} -\\ \text{non reheat preform control value}\end{array}\right)}{\left(\begin{array}{c}L^* \text{ of non reheat preform} -\\ L^* \text{ of preform containing additive}\end{array}\right)}.$$

The data shows that adding the market-leading U1 to a polyester to improve its reheat performance actually makes the polymer much worse—its impact on the polymer's aesthetics far outweighs any benefit it provides through reheat. In comparison, at optimum loading (12.5 ppm active), the WO-C additive more than doubles the non-reheat control polymers efficacy performance.

EXAMPLE 7

Figure 5:
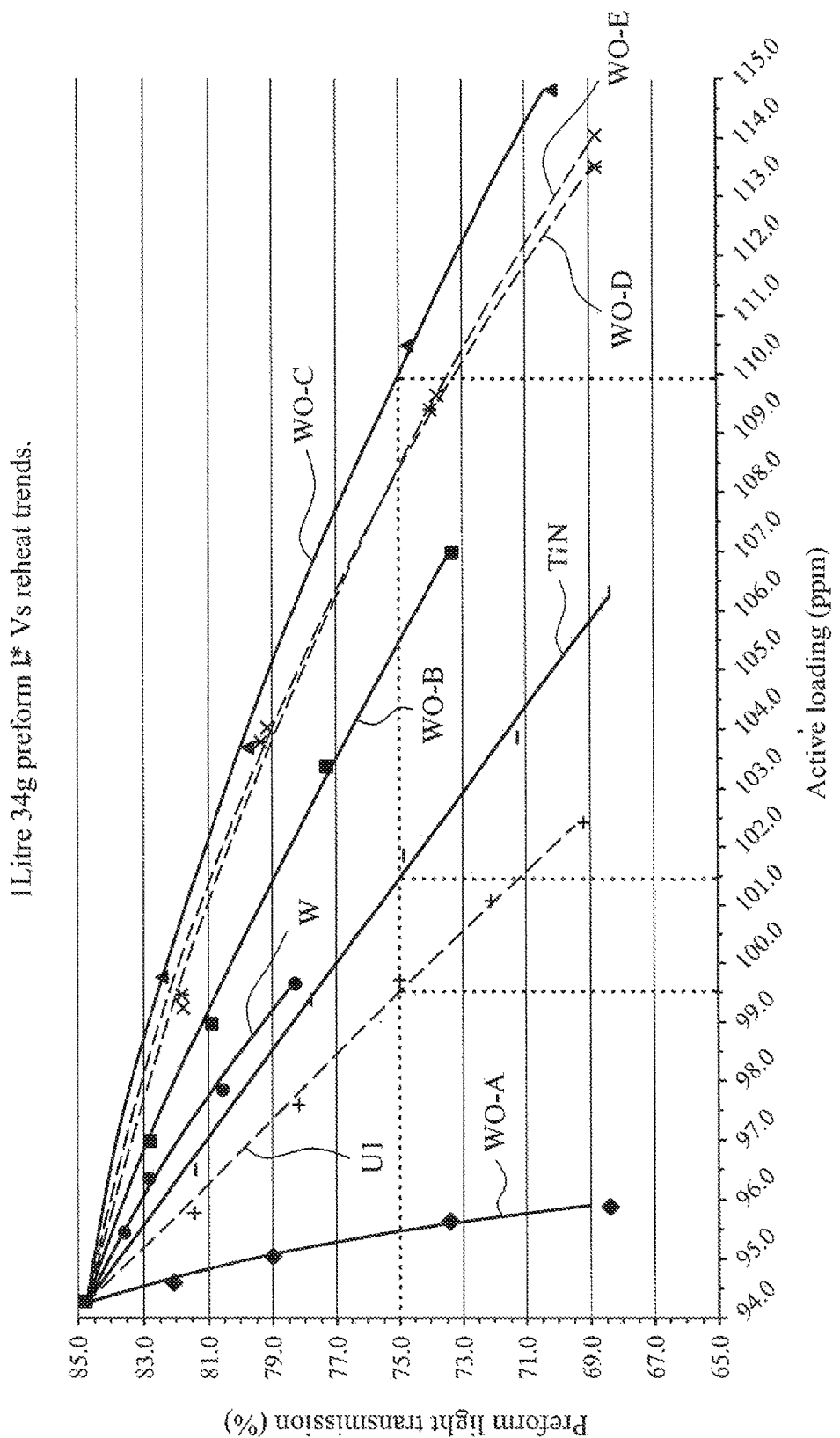
FIG. 5 is a graph of preform light transmission (%) v. peak preform reheat temperature (° C.)

A significant benefit to a polymer having much improved efficacy performance is illustrated by the graph of FIG. 5. The efficacy brings flexibility to polymer manufacturers. For example, referring to FIG. 5, the example highlights a loading of 6 ppm U1 and its impact on preform reheat and L*. This loading would be considered a top of the range reheat product for a carbon based reheat technology. The chart indicates that a preform of similar L* incorporating TiN would return significantly improved reheat performance. A preform produced again of similar L* containing WO-C material would produce what could be considered a super reheat polymer. Alternately the polymer manufacturer has the option of producing a product incorporating WO-C with similar reheat behavior as one containing 6 ppm U1 yet having far superior L*.

The following examples report on experiments undertaken to produce improved (e.g. more cost-effective) dispersions for use in making preforms in the processes described.

EXAMPLE 8

Preparation and Evaluation of Dispersions

Three different dispersions of WO-C were made and evaluated as follows:

Dispersion A—WO-C prepared by dispersing 7.5 g of the tungsten oxide in 92.5 g of carrier using a Hamilton Beach disperser for 5 minutes;

Dispersion B—WO-C, prepared using "optimal" milling. This involves 200 g of the tungsten oxide being mixed with 200 g of carrier to form a slurry which was added to a 250 ml Eiger Terence horizontal bead mill containing 0.7-1 mm cerium beads. The mixture was milled by recirculation for 1 hour.

Figure 6:
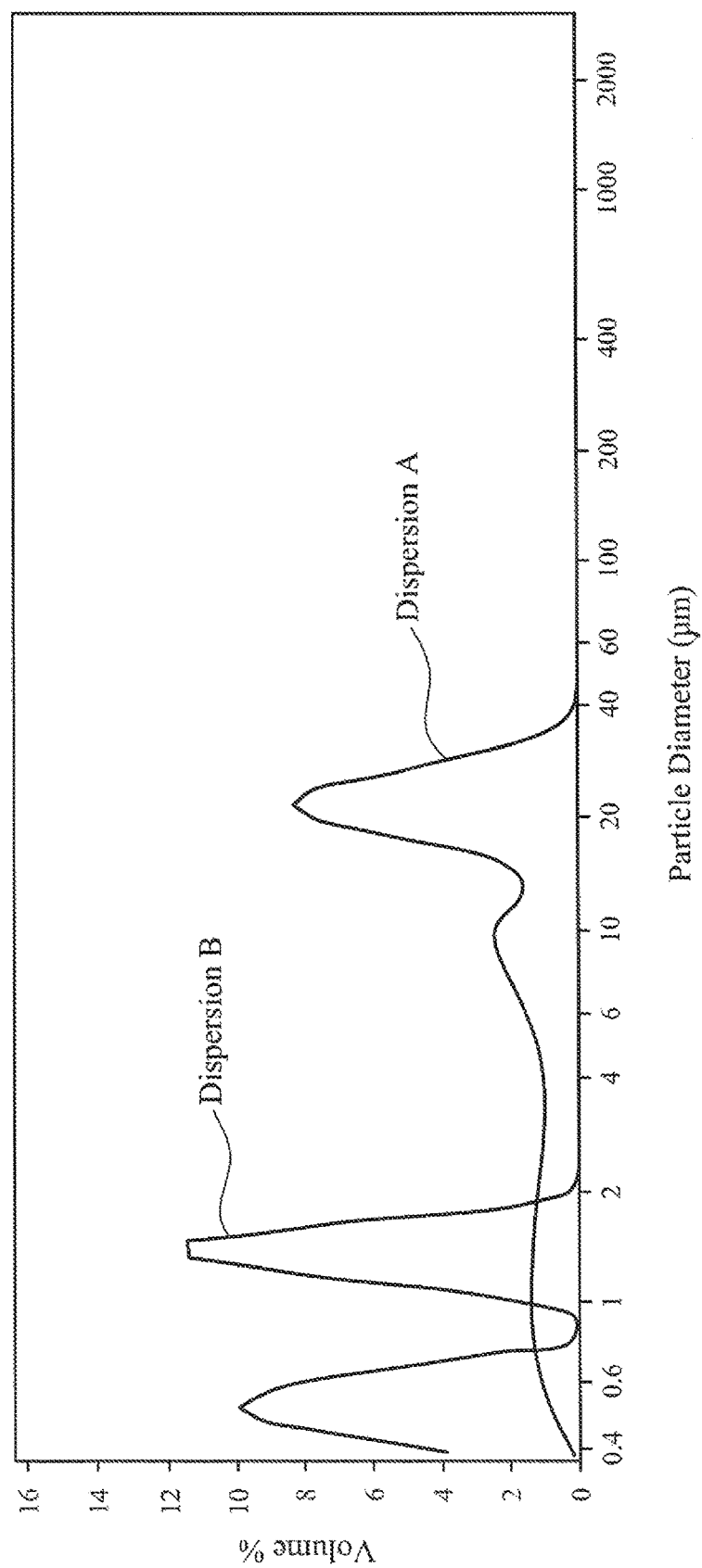
FIG. 6 is a graph providing particle size data for Dispersions A, B and C.

FIG. 6 includes particle size information of particles in Dispersions A and B. It is understood that the milling has not reduced particles sizes further but has broken down the large agglomerations above 4 μm in particle size. All the particles are found to be greater than 0.375 μm but, for Dispersion B, the mean particle sizes have been reduced. Those values are provided in Table 2.

TABLE 2

| Dispersion Reference | $D_{50}$ WO—C particle size (μm) |
|---|---|
| A | 13.2 |
| B | 0.946 |

Figure 7:
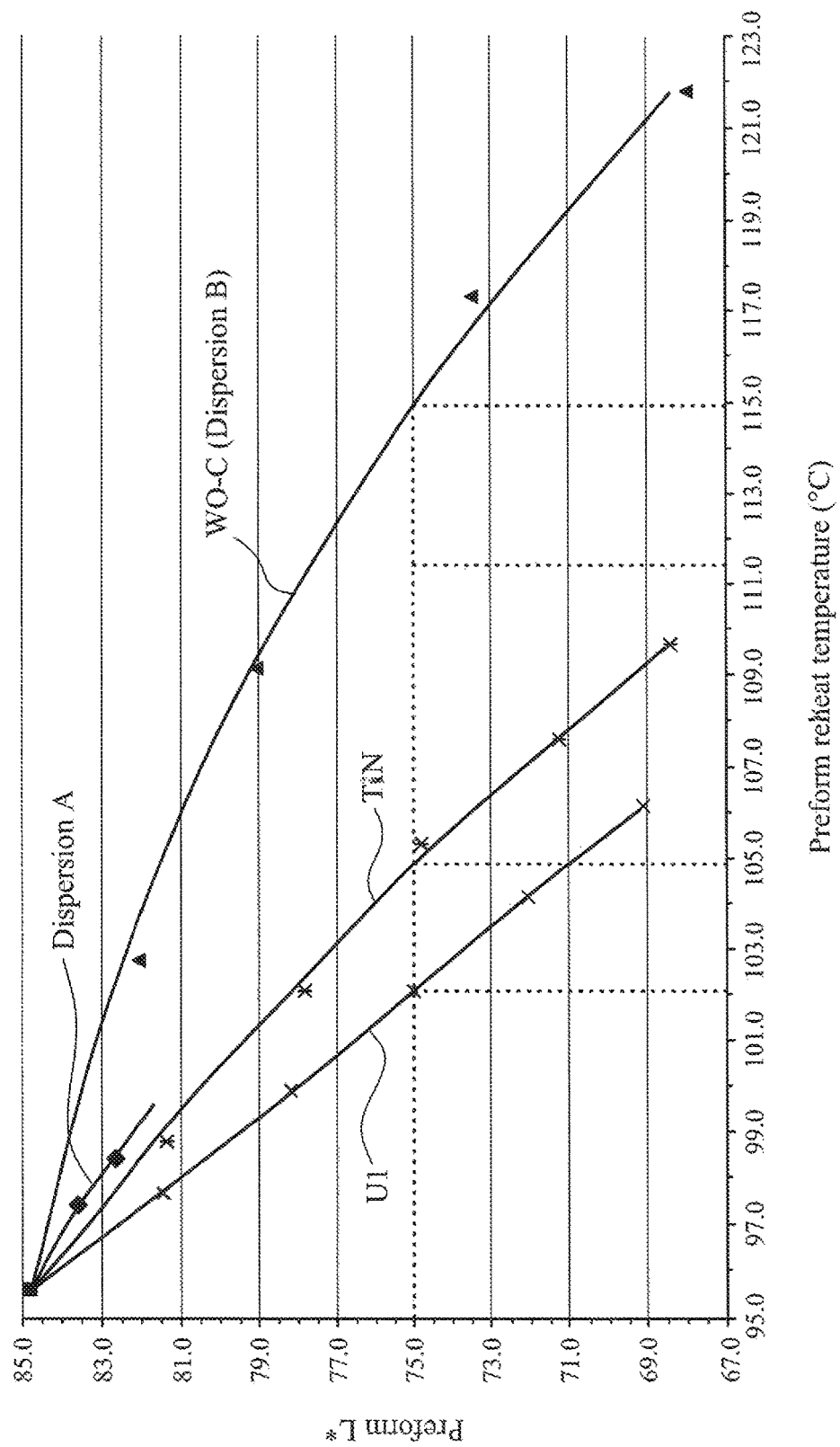
FIG. 7 is a graph of preform L.* v. preform reheat temperature for a series of additives.

Preform L* v. preform reheat temperature was assessed for Dispersions A, and B, U1 and TiN and results are provided in FIG. 7.

FIG. 7 highlights that Dispersion B (having smaller average particle size and a narrower particle size distribution) produces preforms with better efficacy, the benefits of which are less material is required to achieve a targeted reheat range; the seine reheat behaviour can be achieved with better light transmission; and a cheaper product can be offered to customers.

Figure 8:
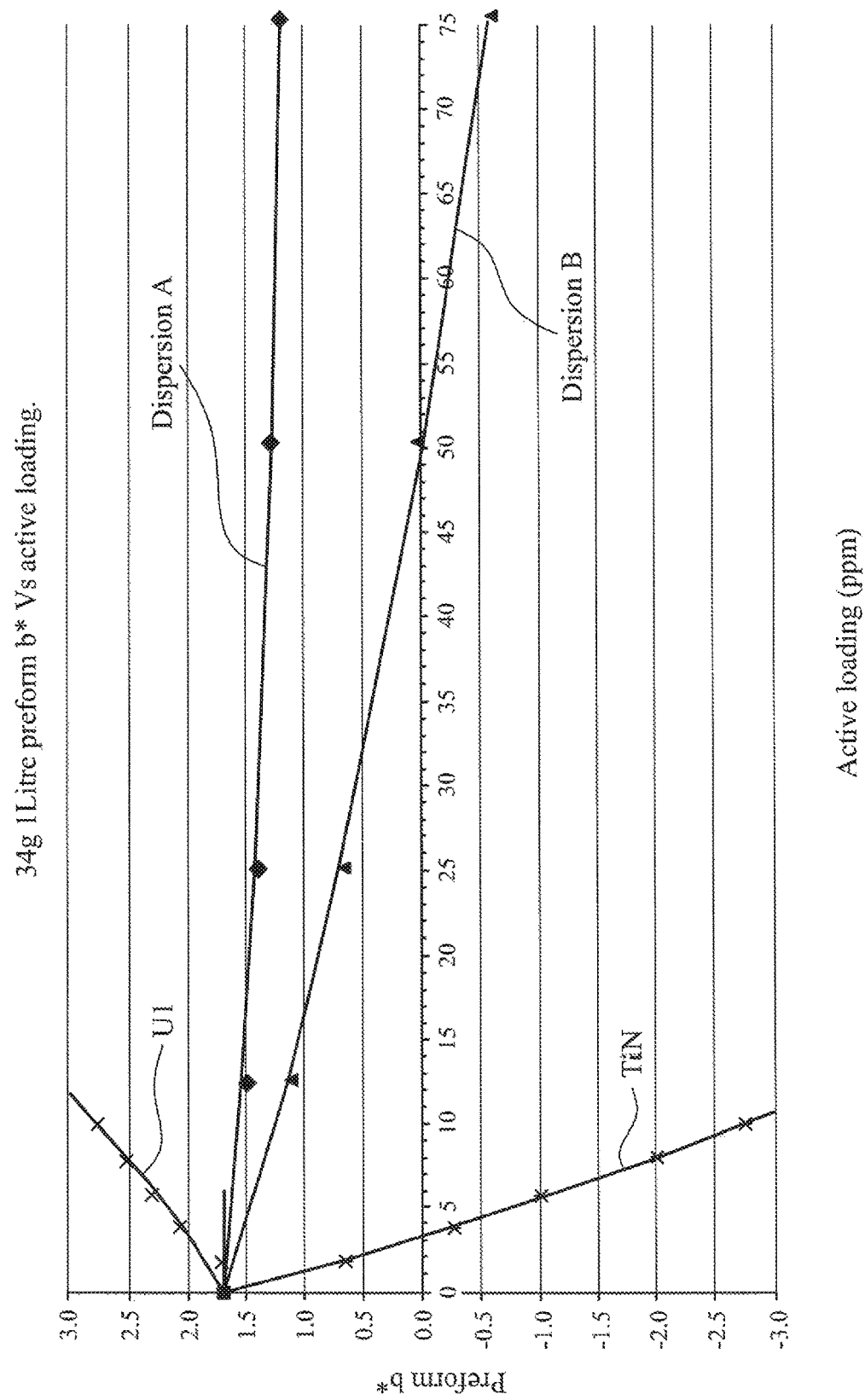
FIG. 8 is a graph of preform b* v. active loading for a series of additives.

Preform b* v. active loading was assessed for Dispersions A and B, U1 and TiN and results are provided in FIG. 8. The figure shows that reducing the particle size of additive particles in the dispersion has brought about a desired blue toning. However, advantageously, compared to TiN, for WO-C material, the effect is not as severe and, consequently, higher loadings of WO-C material can be incorporated into polymers before the preform appears too blue. Further significant reduction in particle size of the WO-C is found to increase the blueing and make the material more like TiN; so reducing particle sizes much further is disadvantageous, due to too much toning.

When adding, TiN neutrality of the b* axis is achieved in the example shown at approximately 3.75 ppm active addition. At this point the preform would start to gain a blue/green tint. In comparison much higher additions of WO-C could be made before this blue/green tint appears. Adding U1 makes the polymer more yellow indicating the manufacturer may need to add additional blue toners to neutralize this effect. Additional toner would result in further loss in polymer L*.

It has been noted that preforms containing Dispersion A return a three times better performance to that of those containing U1. Also, Dispersion B shows that reducing the particle size to the range indicated results in more reheat gain across the loading range compared to the impact it has on preform transmission or L* loss. This influence has brought about increased polymer efficacy.

The invention claimed is:
1. An article comprising:
a polymer composition which includes tungsten oxide particles and an additional additive, wherein said additional additive is selected from an acetaldehyde scavenger and a colourant, wherein when said polymer composition includes an acetaldehyde scavenger, said polymer composition includes at least 10 ppm of said acetaldehyde scavenger and when said polymer composition includes a colourant, said polymer composition includes at least 50 ppm of said colourant, wherein said article is a preform for a container;
wherein said tungsten oxide particles include 18.86 to 20.64 wt % oxygen;
wherein said tungsten oxide particles comprise at least 99 wt % of tungsten and oxygen moieties;

wherein at least 99 wt % of said preform is made up of said polymer composition, wherein said polymer composition includes at least 99 wt % of a polyester polymer, wherein said preform has an L* of at least 65, wherein said tungsten oxide particles have a d50 of less than 25 μm;

wherein said tungsten oxide particles have a span (S) from 0.01 to 5 where S is calculated by the following equation:

$$S=(d_{90}-d_{10})/d_{50}$$

where $d_{90}$ represents a particle size in which 90% of the volume is composed of particles having a smaller diameter than the stated $d_{90}$; $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value and 50% of the volume is composed of particles having a diameter smaller than the stated $d_{50}$ value; wherein less than 5 vol % of said tungsten oxide particles have a particle size of more than 100 μm; and more than 75 vol % of said tungsten oxide particles have a particle size of more than 0.40 μm.

2. An article according to claim 1, wherein said tungsten oxide particles include 19.4 to 19.9 wt % oxygen.

3. An article according to claim 1, said article including 12 to 100 ppm of said tungsten oxide particles.

4. An article according to claim 1, wherein said tungsten oxide particles have a $d_{50}$ of less than 10 μm and greater than 0.1 μm.

5. An article according to claim 1, wherein said article includes at least 10 ppm and less than 100 ppm of said tungsten oxide particles and the L* is at least 70.

6. An article according to claim 1, wherein said polyester composition comprises 5 to 150 ppm of tungsten oxide particles, wherein said polyester polymer consists essentially of PET and wherein said tungsten oxide particles include 19.4 to 19.9 wt % oxygen.

7. An article according to claim 1, wherein said article includes less than 75 ppm of said tungsten oxide particles.

8. An article according to claim 1, wherein said article includes 5 to 50 ppm of said tungsten oxide particles.

9. An article according to claim 1, wherein span (S) is in the range 0.1 to 3.

10. An article according to claim 1, wherein said tungsten oxide particles have a d50 of at least 0.1 μm.

11. An article according to claim 1, wherein said tungsten oxide particles have a d50 of less than 2μm.

12. An article according to claim 1, wherein said article is a preform in the form of a test-tube shaped injection moulding.

13. An article according to claim 1, wherein said preform has a weight in the range 15 to 40 g and includes 0.00009 g to 0.006 g of said tungsten oxide particles.

14. An article according to claim 1, wherein:
said tungsten oxide particles include 19.4 to 19.9 wt % oxygen;
said tungsten oxide particles have a $d_{50}$ of less than 10 μm and greater than 0.1 μm.

15. An article according to claim 1, wherein:
said article includes at least 10 ppm and less than 100 ppm of said tungsten oxide particles and the L* is at least 70;
wherein said polyester polymer consists essentially of PET;

wherein said tungsten oxide particles include 19.4 to 19.9 wt % oxygen; said tungsten oxide particles have a $d_{50}$ of less than 10 μm and greater than 0.1 μm; and span (S) is in the range 0.1 to 3.

16. An article according to claim 1, wherein:
said tungsten oxide particles include 19.4 to 19.9 wt % oxygen;
said tungsten oxide particles have a d50 of at least 0.5 μm;
said article is a preform in the form of a test-tube shaped injection moulding; span (S) is in the range 0.1 to 3; and
said preform includes at least 10 ppm and less than 100 ppm of said tungsten oxide particles.

17. An article comprising,
a polymer composition which includes tungsten oxide particles and an additional additive, wherein said additional additive is selected from an acetaldehyde scavenger and a colourant, wherein when said polymer composition includes an acetaldehyde scavenger, said polymer composition includes at least 10ppm of said acetaldehyde scavenger and when said polymer composition includes a colourant, said polymer composition includes at least 50 ppm of said colourant, wherein said article is a preform for a container; wherein said tungsten oxide particles include 18.86 to 20.64 wt % oxygen;
wherein said tungsten oxide particles comprise at least 99 wt % of tungsten and oxygen moieties;
wherein at least 99 wt % of said preform is made up of said polymer composition,
wherein said polymer composition includes at least 99 wt % of a polyester polymer,
wherein said preform has an L* of at least 65,
wherein said tungsten oxide particles have a d50 of less than 25 μm;
wherein said tungsten oxide particles have a span (S) from 0.01 to 5 where S is calculated by the following equation:

$$S=(d_{90}-d_{10})/d_{50}$$

where $d_{90}$ represents a particle size in which 90% of the volume is composed of particles having a smaller diameter than the stated $d_{90}$; $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value and 50% of the volume is composed of particles having a diameter smaller than the stated $d_{50}$ value wherein said article includes 50 ppm or less of said tungsten oxide particles; and
wherein said tungsten oxide particles have a $d_{50}$ of less than 10 μm and greater than 0.1 μm.

18. An article according to claim 17, wherein less than 5 vol % of said tungsten oxide particles have a particle size of more than 100 μm; and more than 75 vol % of said tungsten oxide particles have a particle size of more than 0.40 μm.

19. An article comprising a polymer composition which includes tungsten oxide particles and an additional additive, wherein said additional additive is selected from an acetaldehyde scavenger and a colourant, wherein when said polymer composition includes an acetaldehyde scavenger, said polymer composition includes at least 10 ppm of said acetaldehyde scavenger and when said polymer composition includes a colourant, said polymer composition includes at least 50 ppm of said colourant, wherein said article is a preform for a container;

wherein said tungsten oxide particles include 18.86 to 20.64 wt % oxygen;
    wherein said tungsten oxide particles comprise at least 99 wt % tungsten and oxygen moieties;
        wherein at least 99 wt % of said preform is made up of said polymer composition,
        wherein said polymer composition includes at least 99 wt % of a polyester polymer,
        wherein said preform has an L* of at least 65,
        wherein said tungsten oxide particles have a d50 of less than 25 μm;
        wherein said tungsten oxide particles have a span (S) from 0.01 to 5 where S is calculated by the following equation:

$$S=(d_{90}-d_{10})/d_{50}$$

where $d_{90}$ represents a particle size in which 90% of the volume is composed of particles having a smaller diameter than the stated $d_{90}$ $d_{10}$ represents a particle size in which 10% of the volume is composed of particles having a diameter smaller than the stated $d_{10}$; and $d_{50}$ represents a particle size in which 50% of the volume is composed of particles having a diameter larger than the stated $d_{50}$ value and 50% of the volume is composed of particles having a diameter smaller than the stated $d_{50}$ value, wherein said tungsten oxide particles have a d50 of at least 0.5 μm.

* * * * *